United States Patent
Chang et al.

(10) Patent No.: US 8,094,191 B2
(45) Date of Patent: Jan. 10, 2012

(54) SYSTEM AND METHOD FOR CORRECTING AN IMAGE

(75) Inventors: Chih-Kuang Chang, Taipei Hsien (TW); Xian-Yi Chen, Shenzhen (CN); Xiao-Guang Xue, Shenzhen (CN); Li Jiang, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 403 days.

(21) Appl. No.: 12/430,122

(22) Filed: Apr. 27, 2009

(65) Prior Publication Data

US 2010/0103257 A1  Apr. 29, 2010

(30) Foreign Application Priority Data

Oct. 29, 2008  (CN) .......................... 2008 10 305272

(51) Int. Cl.
*H04N 7/18* (2006.01)
*H04N 5/228* (2006.01)
*G06K 9/00* (2006.01)

(52) U.S. Cl. ...................... 348/135; 348/222.1; 382/141
(58) Field of Classification Search ........................ None
See application file for complete search history.

(56) References Cited

U.S. PATENT DOCUMENTS

| | | | |
|---|---|---|---|
| 5,297,238 A * | 3/1994 | Wang et al. | 700/259 |
| 7,626,578 B2 * | 12/2009 | Wilson et al. | 345/175 |
| 2004/0008259 A1 * | 1/2004 | Gokturk et al. | 348/207.1 |
| 2007/0173792 A1 * | 7/2007 | Arnoldussen | 606/4 |
| 2008/0291447 A1 * | 11/2008 | Vakrat et al. | 356/364 |
| 2009/0128648 A1 * | 5/2009 | Ikeda et al. | 348/222.1 |

* cited by examiner

*Primary Examiner* — Wen-Tai Lin
(74) *Attorney, Agent, or Firm* — Altis Law Group, Inc.

(57) ABSTRACT

A method for correcting an image of a physical object first captures images of a circle and a rectangle set of a calibration plate placed on a measurement machine, and determines correction data using the images of the circle and the rectangle. The method further corrects the image of the physical object captured by the measurement machine according to the correction data, and displays a corrected image of the physical object.

20 Claims, 11 Drawing Sheets

SYSTEM AND METHOD FOR CORRECTING AN IMAGE

BACKGROUND

1. Technical Field

Embodiments of the present disclosure generally relate to data correction technique, and more particularly, to a system and method for correcting an image captured by a measurement machine.

2. Description of Related Art

In the precision measurement field, a charge coupled device (CCD) installed in a measurement machine can capture an image of a physical object through focusing on the physical object by a lens. The measurement machine determines precision of the physical object via measuring the image of the physical object. However, due to some factors, for example, deviation caused by the CCD and the lens, the image of the physical object may be distorted.

DETAILED DESCRIPTION

All of the processes described below may be embodied in, and fully automated via, function code modules executed by one or more general purpose computers or processors. The code modules may be stored in any type of computer-readable medium or other computer storage device. Some or all of the methods may alternatively be embodied in specialized computer hardware.

Figure 1:
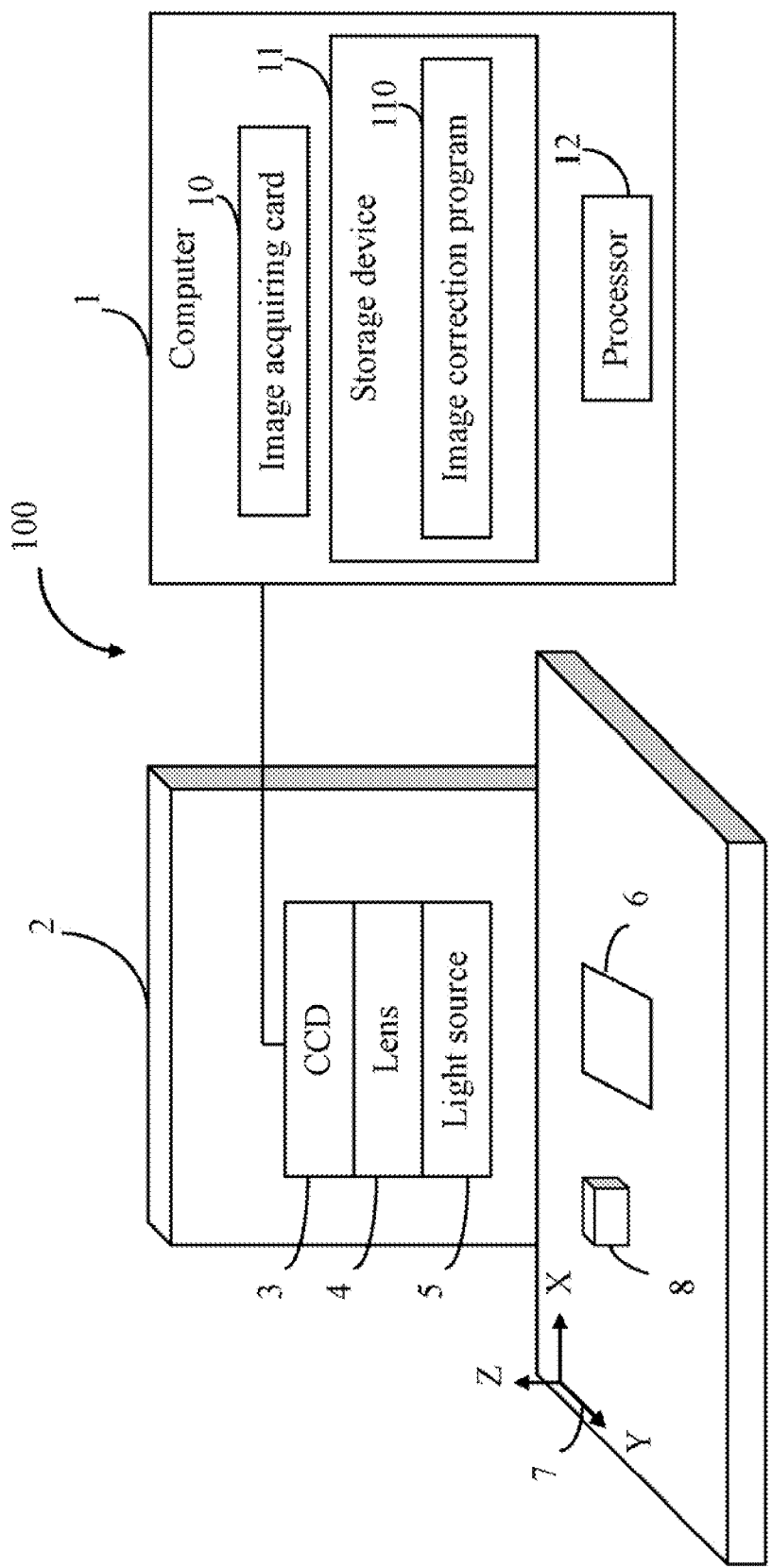
FIG. 1 is a block diagram of one embodiment of a system for correcting an image.

FIG. 1 is a block diagram of one embodiment of a system 100 for correcting an image captured by a measurement machine 2. In one embodiment, the system 100 includes a computer 100 and the measurement machine 2. A calibration plate 6 is placed on a work plane of the measurement machine 2. The measurement machine 2 has a coordinate system 7. A charge coupled device (CCD) 3 coupled with a lens 4 is installed on Z-axis of the measurement machine 2 for capturing images of the calibration plate 6 and physical objects, such as a physical object 8. Furthermore, a light source 5 is installed on the Z-axis of the measurement machine 2 to provide light source when capturing the images of the calibration plate 6 and the physical object 8.

The computer 100 is connected to the measurement machine 2. In one embodiment, the computer 100 includes an image acquiring card 10 and a storage device 11. The image acquiring card 10 is connected to the CCD 3 electronically, and receives captured images transferred from the CCD 3. The captured images can be displayed on a monitor (not shown) of the computer 1.

The storage device 11 may be a hard disk drive, a floppy disk drive, and so on, which stores at least one operational program used to control and implement one or more systems and methods of the present disclosure. In one embodiment, the operational program is an image correction program 110 for correcting the captured image of the physical object 8.

It may be understood that, one or more specialized or general purpose processors, such as a processor 12, in the computer 1, may be used to execute one or more computerized instructions for the function modules of the image correction program 110.

Figure 2:
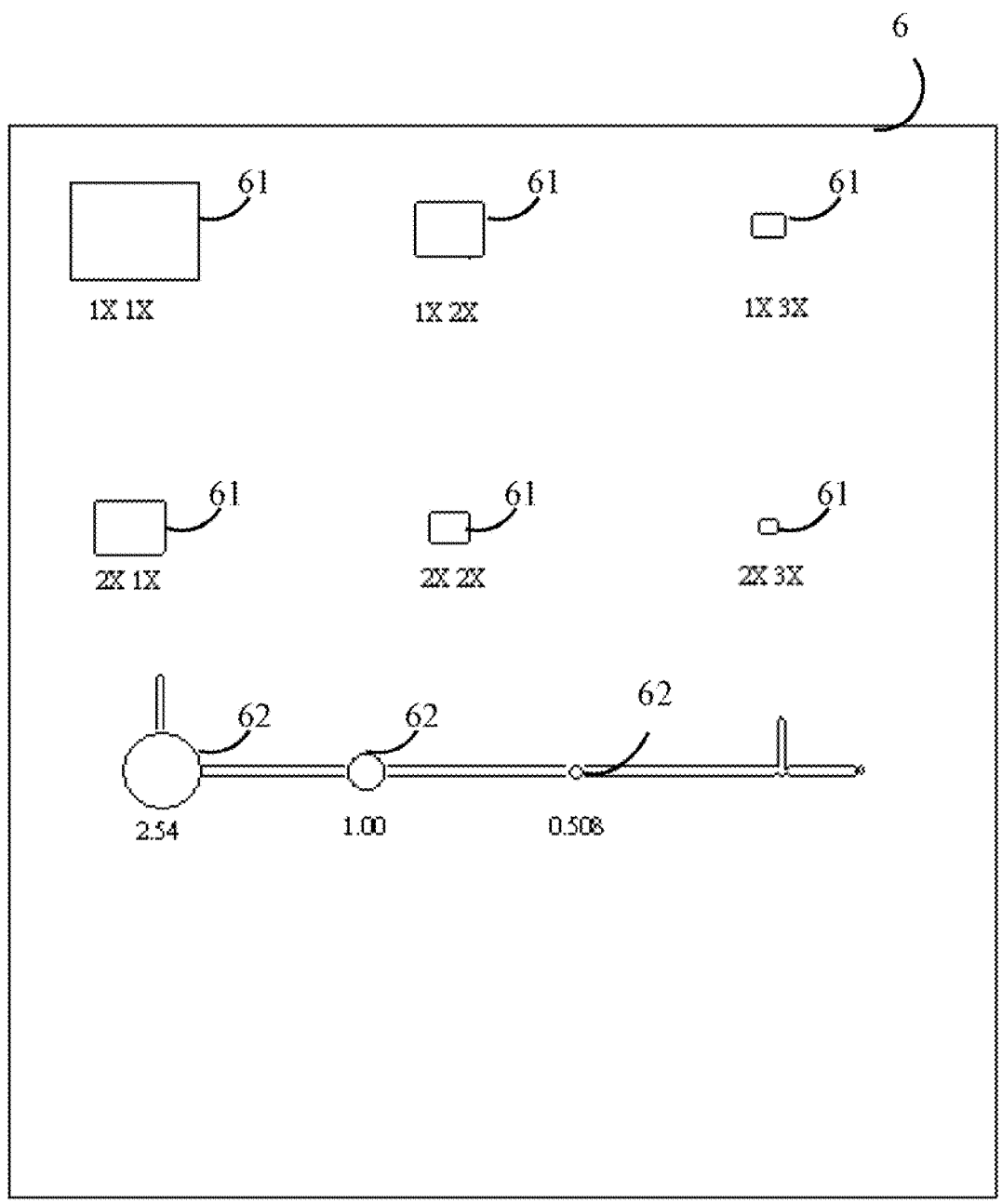
FIG. 2 illustrates a calibration plate in the system of FIG. 1.
Figure 3:
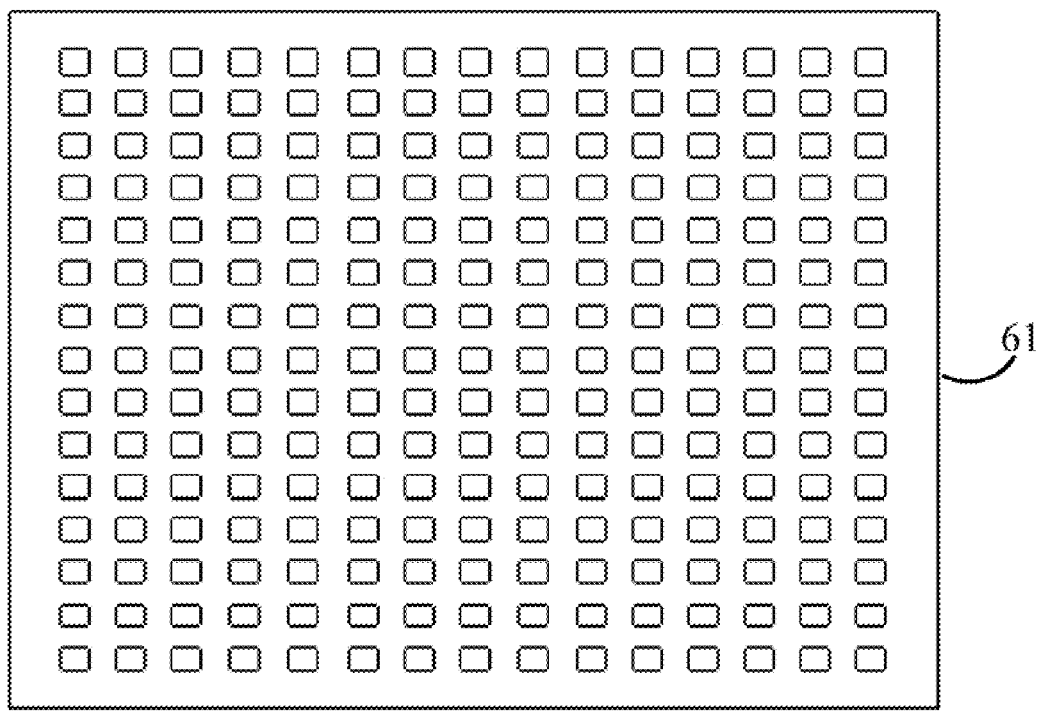
FIG. 3 illustrates a rectangle set in the calibration plate of FIG. 3.

FIG. 2 illustrates the calibration plate 6. The calibration plate 6 includes one or more rectangles sets 61 and one or more circles 62 with different sizes. Each of the rectangles sets 61 includes a plurality of rectangles having the same size, which is illustrated in FIG. 3. The horizontal space or the vertical space between any two adjacent rectangles in each rectangle set 61 is uniform.

Figure 4:
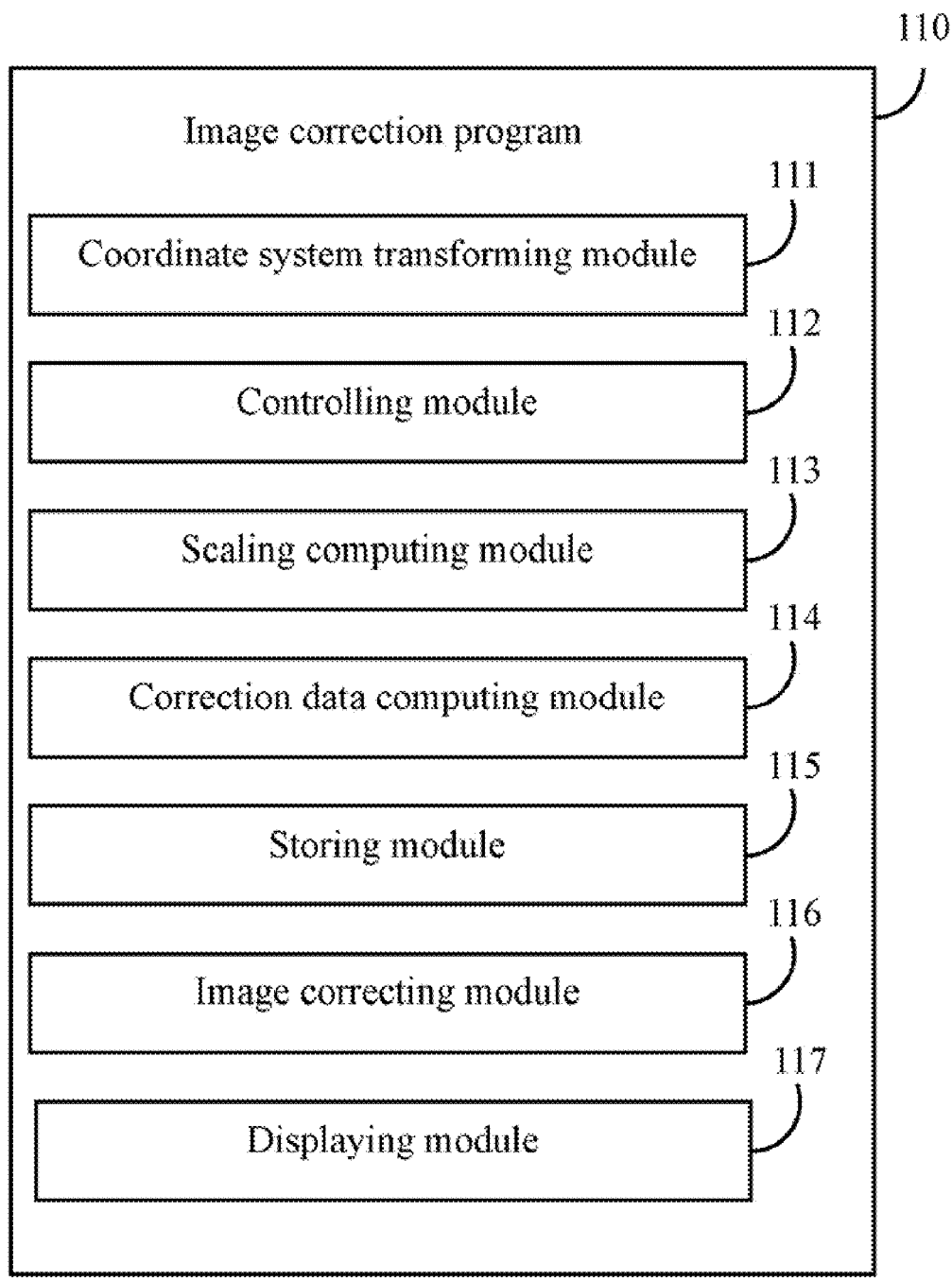
FIG. 4 is a block diagram of one embodiment of function modules of an image correction program in the system in FIG. 1.

FIG. 4 is a block diagram of one embodiment of function modules of the image correction program 110 in FIG. 1. In one embodiment, the image correction program 110 includes a coordinate system transforming module 111, a controlling module 112, a scaling computing module 113, a correction data computing module 114, a storing module 115, an image correcting module 116, and a displaying module 117.

The coordinate system transforming module 111 is operable to transform the coordinate system 7 of the measurement machine 2 to a new coordinate system whose origin is the center of a preset circle 62 selected from the calibration plate 6. All operations described below are executed using the new coordinate system.

The controlling module 112 is operable to control movement of the Z-axis of the measurement machine 2, to focus the lens 4 on one of the rectangle sets 61, one of the circles 62, or the physical object 8, and enable the CCD 3 to capture an image of the rectangle set 61, the circle 62, or the physical object 8. Furthermore, the controlling module 112 is operable to control the light source 5 to emit light with a predetermined intensity (brightness) when capturing the image of the rectangle set 61, the circle 62, or the physical object 8 by the lens 4.

The scaling computing module 113 is operable to determine a scaling of the lens 4. It may be understood that, the scaling of the lens 4 is the ratio of a size of an object (e.g., the circle 62 or the physical object 8) to a size of an image of the object captured by the lens 4 and the CCD 3.

The correction data computing module 114 is operable to determine correction data for correcting the image of the physical object 8 according to the scaling of the lens 4 using the calibration plate 6. Further details of how to determine the correction data will be explain below.

The storing module 115 is operable to store the correction data into the storage device 11 of the computer 1.

The image correcting module 116 is operable to correct the image of the physical object 8 using the correction data.

The displaying module 117 is operable to display a corrected image of the physical object 8 through the monitor of the computer 1.

Figure 5:
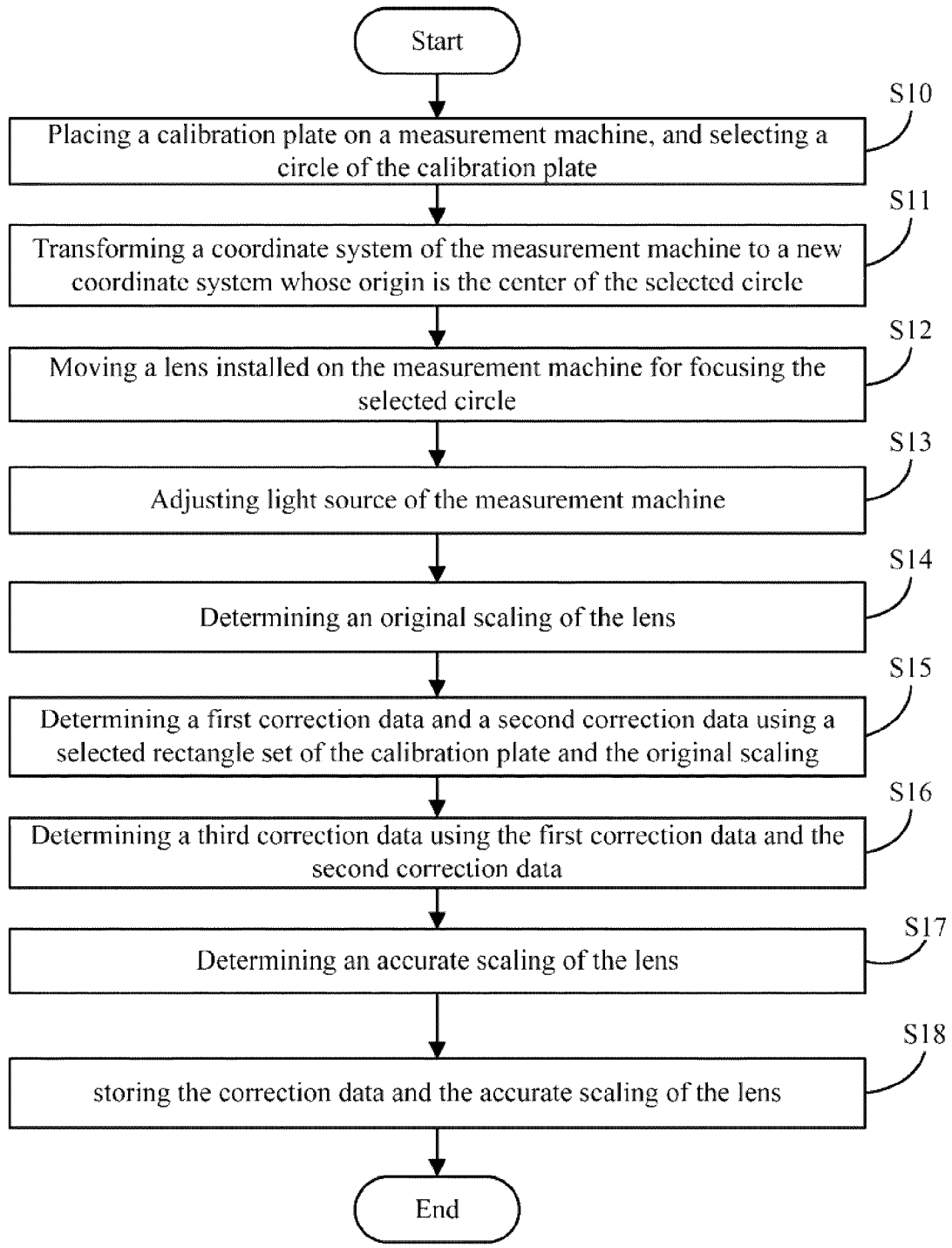
FIG. 5 is a flowchart illustrating one embodiment of a method for determining correction data.

FIG. 5 is a flowchart illustrating one embodiment of a method for determining the correction data. Depending on the embodiment, additional blocks in the flow of FIG. 5 may be added, others removed, and the ordering of the blocks may be changed.

In block S10, the calibration plate 6 is disposed on the work plane of the measurement machine 2, and one circle 62 is selected (hereinafter referred to as "the selected circle") from the calibration plate 6.

In block S11, the coordinate system transforming module 111 transforms the coordinate system 7 of the measurement machine 2 to a new coordinate system whose origin is the center of the selected circle 62 of the calibration plate 6. All operations described below are executed using the new coordinate system.

In block S12, the controlling module 112 controls the Z-axis of the measurement machine 2 to move, thereby, focusing the lens 4 on the selected circle 62, and enabling the CCD 3 to capture an image of the selected circle 62.

In block S13, the controlling module 112 further adjusts the light source 5 of the measurement machine 2 to emit light with suitable brightness when focusing on the selected circle 62.

In block S14, the scaling computing module 113 determines an original scaling of the lens 4. The method detailing block S14 is described in FIG. 6 below.

In block S15, the correction data computing module 114 determines first correction data and second correction data according to the original scaling of the lens 4 using the calibration plate 6. The method detailing block S11 is described in FIG. 7 below.

In block S16, the correction data computing module 114 further determines third correction data using the first correction data and the second correction data. The method detailing block S16 is described in FIG. 8 below.

In block S17, the scaling computing module 113 determines an accurate scaling of the lens 4 according to the first correction data, the second correction data, and the third correction data. The method detailing block S17 is described in FIG. 9 below.

In block S18, the storing module 115 stores the correction data and the accurate scaling of the lens 4 into the storage device 11 of the computer 1. The correction data includes the first correction data, the second correction data, and the third correction data.

Figure 6:
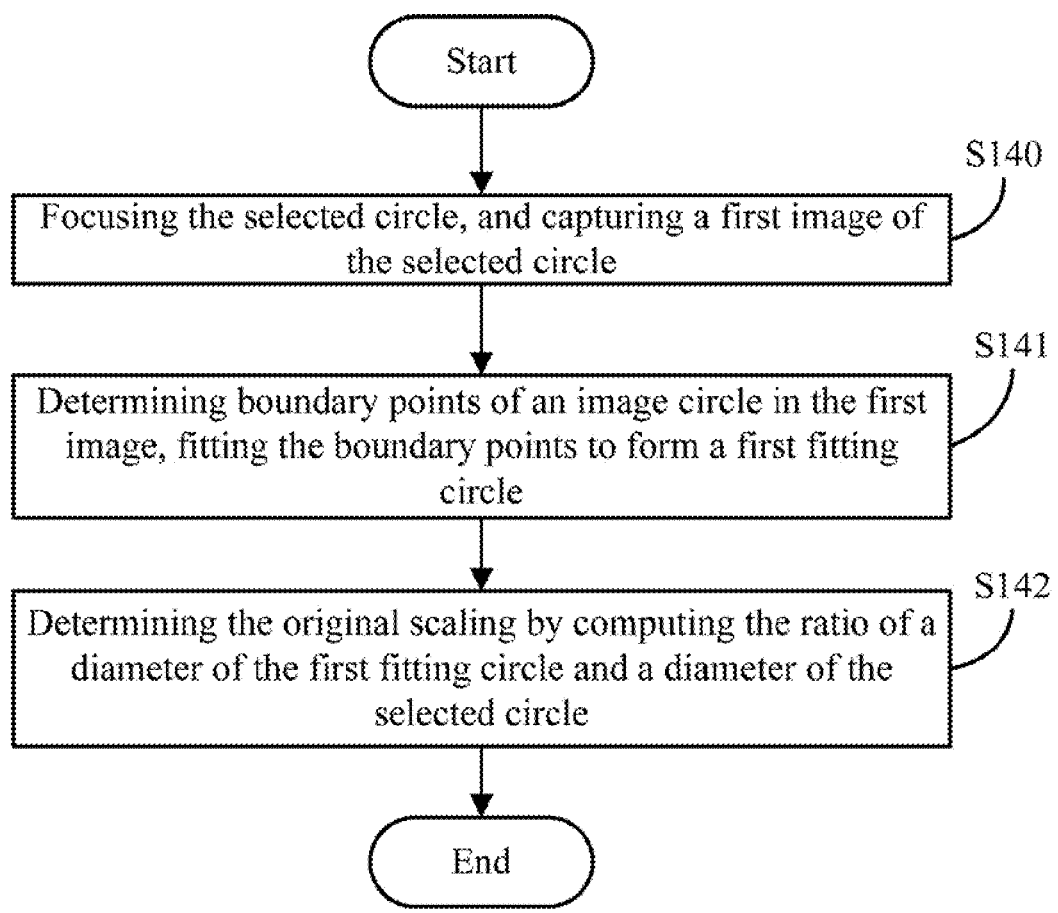
FIG. 6 is a flowchart illustrating one embodiment of a method detailing block S14 of FIG. 5.

FIG. 6 is a flowchart illustrating one embodiment of a method detailing block S14 of FIG. 5. Depending on the embodiment, additional blocks in the flow of FIG. 6 may be added, others removed, and the ordering of the blocks may be changed.

In block S140, the lens 4 focuses on the selected circle 62 of the calibration plate 6, and the CCD 3 captures a first image of the selected circle 62. It may be understood that, the first image of the selected circle 62 includes an image circle.

In block S141, the scaling computing module 113 determines boundary points of the image circle in the first image of the selected circle 62 according to gray values of points in the first image, and fits the boundary points to form a first fitting circle. In one embodiment, in order to determine the boundary points, the scaling computing module 113 creates a straight line on the first image of the selected circle 62, compares gray values of points of the straight line, and selects one or more points whose gray value is distinctly different from their adjacent point's gray value. For example, if the gray values of the points of the straight line are respectively: P0=0, P2=0, P3=1, P4=0, P5=2, P6=3, P7=240, P8=245, P9=255, P10=255, P11=254, P12=254, P13=253, P14=250, P15=2, then point "P7" and point "P15" are determined as boundary points. It may be understood that, the scaling computing module 113 creates a plurality of straight lines to determine a plurality of boundary points.

In block S142, the scaling computing module 113 determines the original scaling by computing the ratio between a diameter of the first fitting circle and an actual/real diameter of the selected circle 62 of the calibration plate 6.

Figure 7:
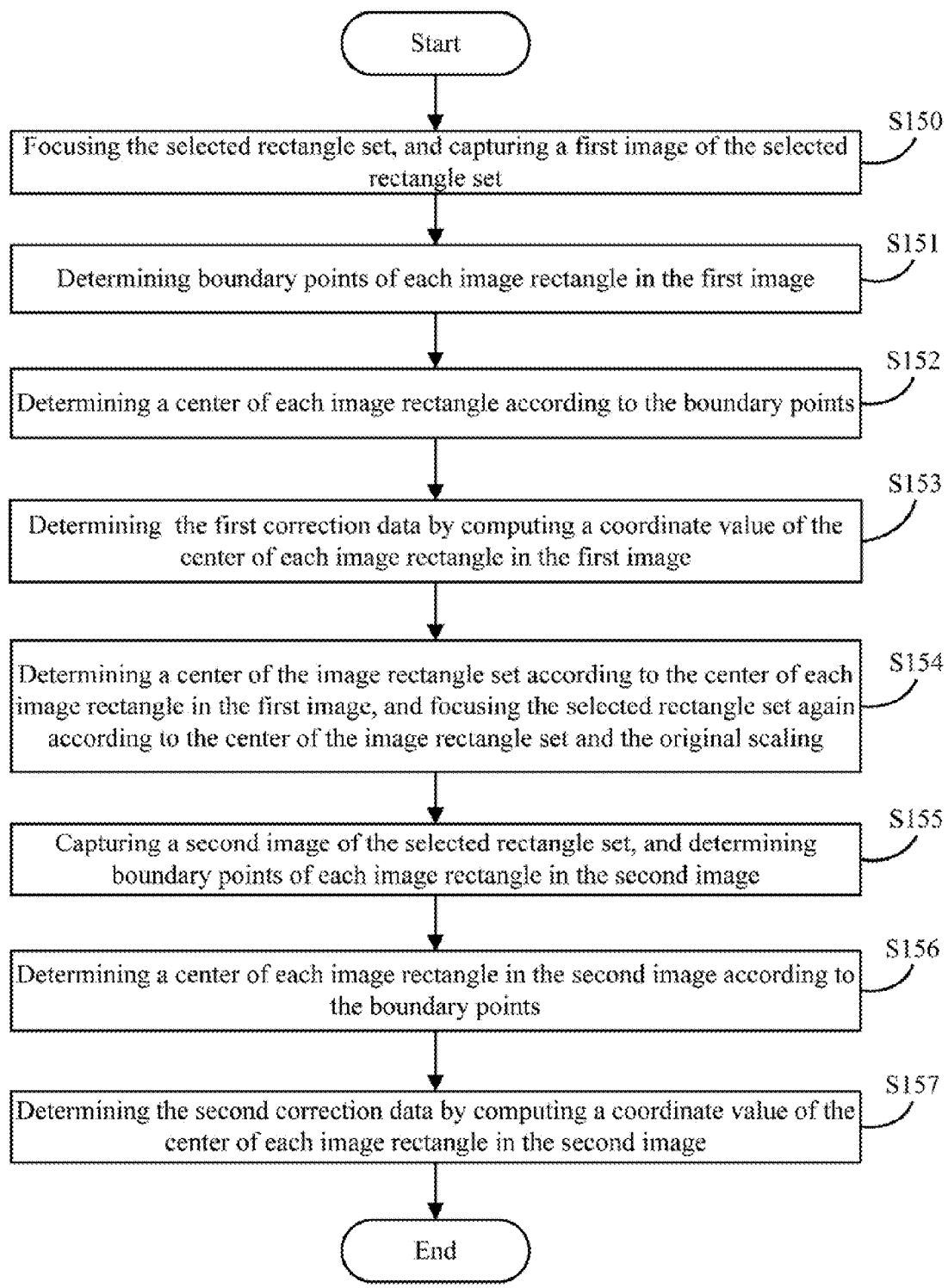
FIG. 7 is a flowchart illustrating one embodiment of a method detailing block S15 of FIG. 5.

FIG. 7 is a flowchart illustrating one embodiment of a method detailing block S15 of FIG. 5. Depending on the embodiment, additional blocks in the flow of FIG. 7 may be added, others removed, and the ordering of the blocks may be changed.

In block S150, the controlling module 112 controls the Z-axis of the measurement machine 2 to move for enabling the lens 4 to focus on a selected rectangle set 61, and enabling the CCD 3 to capture a first image of the selected rectangle set 61. It may be understood that, the first image of the selected rectangle set 61 includes an image rectangle set, and the image rectangle set includes a plurality of image rectangle.

Figure 11:
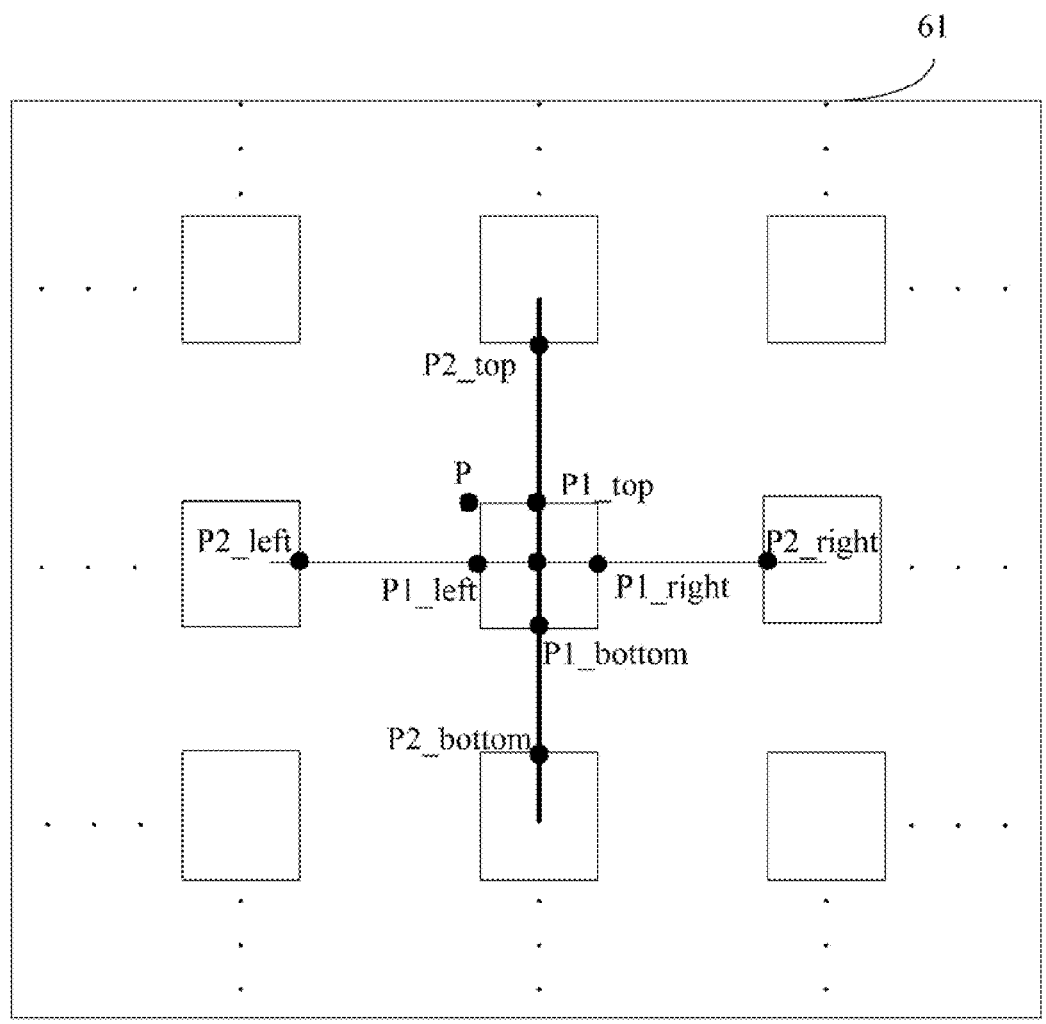
FIG. 11 illustrates a method of determining boundary points of a rectangle.

In block S151, the correction data computing module 114 determines boundary points of each image rectangle in the first image of the selected rectangle set 61. The method of determining boundary points of each image rectangle is illustrated as follows, which refers to FIG. 11.

The correction data computing module 114 firstly obtains a center "P" of the first image of the selected rectangle set 61, and obtains an image rectangle which is nearest to the point "P" (hereinafter referred to as "the nearest rectangle") from the first image of the selected rectangle set 61. The correction data computing module 114 further determines a center of the nearest rectangle by fitting a circle, and creates orthogonal/perpendicular lines intersecting the center of the nearest rectangle figure. The correction data computing module 114 then determines boundary points in each line according to gray values. The boundary points may include P1_top, P2_top, P1_bottom, P2_bottom, P1_left, P2_left, P1_right, and P2_right. Furthermore, the correction data computing module 114 computes a length and a width of the image rectangle according to the P1_top, P1_bottom, P1_left, and P1_right. In addition, the correction data computing module 114 computes a horizontal space and a vertical space between two adjacent image rectangles in the first image of the selected rectangle set 61 according to P1_top, P2_top, and P1_left, P2_left. Moreover, the correction data computing module 114 computes a center of each image rectangle in the first image of the selected rectangle set 61 according to the center of the nearest rectangle, the length and the width of the image rectangle, and the horizontal space and the vertical space. Finally, the correction data computing module 114 creates orthogonal perpendicular lines intersecting the center of each image rectangle, and determines boundary points of each image rectangle from the lines according to gray values. The boundary point in each line may be presented as Pn_top, Pn_bottom, Pn_left, or Pn_right.

In block S152, the correction data computing module 114 determines a center of each image rectangle in the first image of the selected rectangle set 61 anew according to the boundary points Pn_top, Pn_bottom, Pn_left, and Pn_right.

In block S153, the correction data computing module 114 computes a coordinate value of the center of each image rectangle in the first image of the selected rectangle set 61 according to the coordinate values of the boundary points Pn_top, Pn_bottom, Pn_left, and Pn_right. The coordinate value of the center of each image rectangle in the first image of the selected rectangle set 61 is the first correction data.

In block S154, the correction data computing module 114 determines a center of the image rectangle set according to the center of each image rectangle in the first image of the selected rectangle set 61, and the lens 4 focuses on the selected rectangle set 61 again according to the center of the image rectangle set and the original scaling.

In block S155, the CCD 3 captures a second image of the selected rectangle set 61, and determines boundary points of each image rectangle in the second image of the selected rectangle set 61. The method of determining boundary points of each image rectangle has been described above.

In block S156, the correction data computing module 114 determines a center of each image rectangle in the second image of the selected rectangle set 61 according to the boundary points.

In block S157, the correction data computing module 114 computes a coordinate value of the center of each image rectangle in the second image of the selected rectangle set 61 according to the coordinate values of the boundary points. The coordinate values of the center of each image rectangle in the second image of the selected rectangle set 61 is the second correction data.

Figure 8:
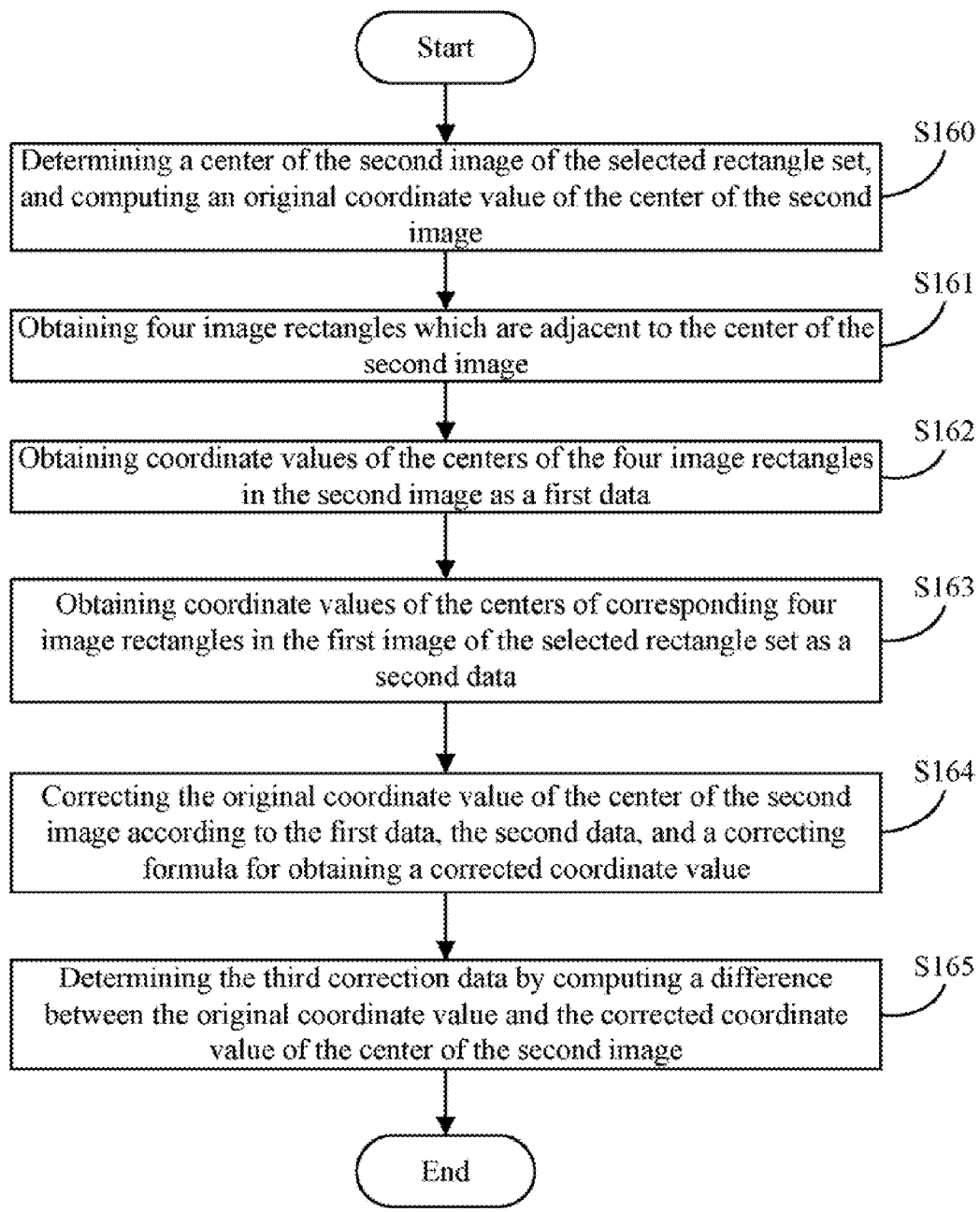
FIG. 8 is a flowchart illustrating one embodiment of a method detailing block S16 of FIG. 5.

FIG. 8 is a flowchart illustrating one embodiment of a method detailing block S16 of FIG. 5. Depending on the embodiment, additional blocks in the flow of FIG. 8 may be added, others removed, and the ordering of the blocks may be changed.

In block S160, the correction data computing module 114 obtains a center of the second image of the selected rectangle set 61, and obtains an original coordinate value of the center of the second image of the selected rectangle set 61.

In block S161, the correction data computing module 114 obtains four image rectangles adjacent to the center of the second image of the selected rectangle set 61.

In block S162, the correction data computing module 114 takes coordinate values (ax1, ay1), (ax2, ay2), (ax3, ay3), and (ax4, ay4) of the centers of the four image rectangles in the second image from the second correction data as first data.

In block S163, the correction data computing module 114 takes coordinate values (bx1, ay1), (bx2, ay2), (bx3, by3), and (bx4, by4) of the centers of corresponding four image rectangles in the first image from the first correction data as second data.

In block S164, the correction data computing module 114 corrects the original coordinate value of the center of the second image of the selected rectangle set 61 according the first data, the second data, and a correcting formula for obtaining a corrected coordinate value of the center of the second image of the selected rectangle set 61. In one embodiment, the correcting formula is a bilinear transformation formula as follows:

$$\begin{cases} x' = r(x, y) \\ y' = s(x, y) \\ r(x, y) = C1x + C2y + C3xy + C4 \\ s(x, y) = C5x + C6y + C7xy + C8. \end{cases}$$

According to the above correcting formula, by replacing (x',y') with the first data, and replacing (x,y) with the second data, the parameters C1~C8 can be solved. Finally, by introducing the parameters C1~C8 and the original coordinate value of the center of the second image of the selected rectangle set 61 into the correcting formula:

$$\begin{cases} x' = C1x + C2y + C3xy + C4 \\ y' = C5x + C6y + C7xy + C8, \end{cases}$$

the corrected coordinate value (x',y') of the center of the second image of the selected rectangle set 61 can be solved.

In block S165, the correction data computing module 114 determines the third correction data by computing a difference between the original coordinate value and the corrected coordinate value of the center of the second image of the selected rectangle set 61.

Figure 9:
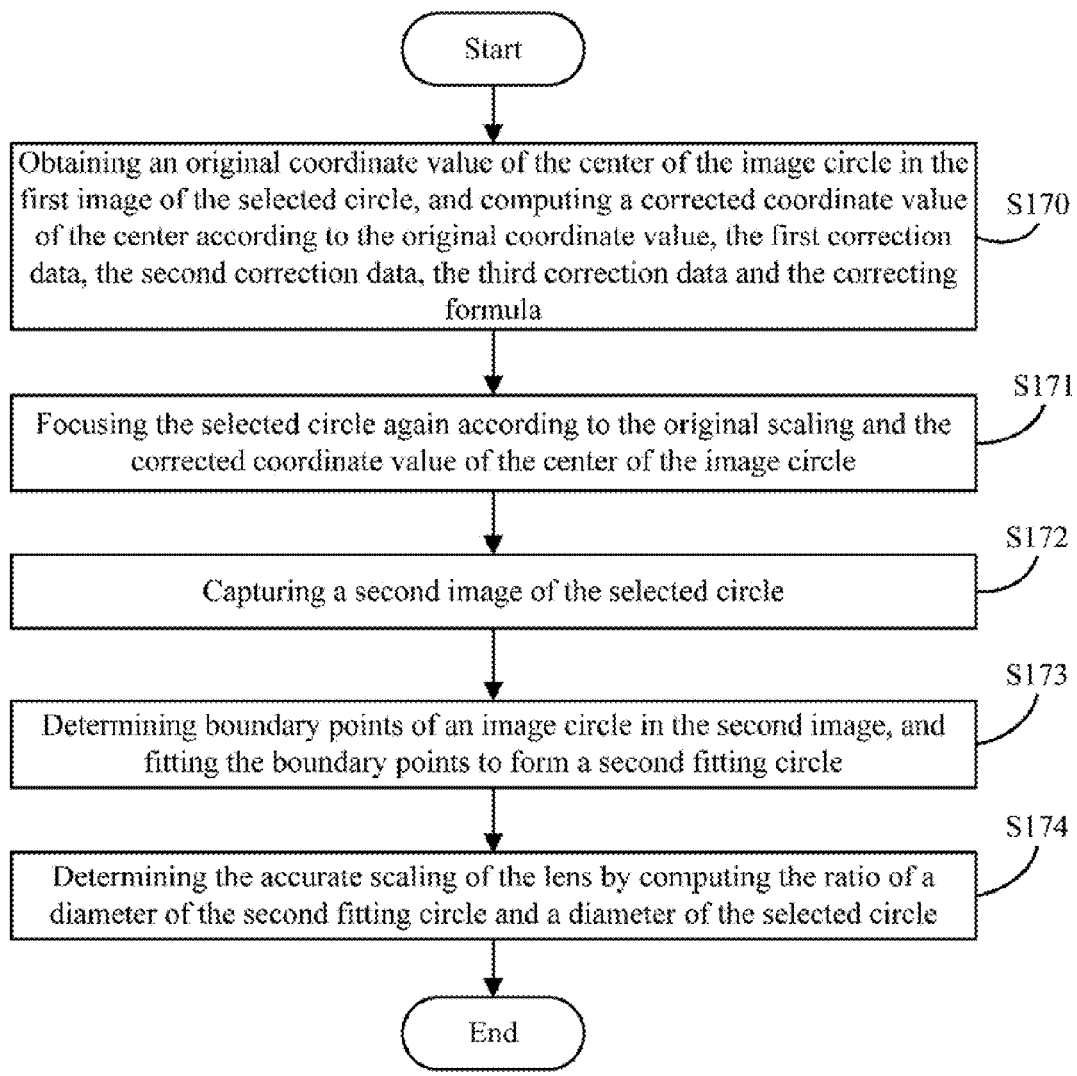
FIG. 9 is a flowchart illustrating one embodiment of a method detailing block S17 of FIG. 5.

FIG. 9 is a flowchart illustrating one embodiment of a method detailing block S17 of FIG. 5. Depending on the embodiment, additional blocks in the flow of FIG. 9 may be added, others removed, and the ordering of the blocks may be changed.

In block S170, the scaling computing module 113 obtains an original coordinate value of the center of the image circle in the first image of the selected circle 62, and computes an corrected coordinate value of the center of the image circle in the first image of the selected circle 62 according to the original coordinate value, the first correction data, the second correction data, the third correction data, and the correcting formula. The process of computing the corrected coordinate value of the center of the image circle in the first image of the selected circle 62 is similar to the process of FIG. 8 described above.

In block S171, the lens 4 focuses on the selected circle 62 again according to the original scaling and the corrected coordinate value of the center of the image circle in the first image of the selected circle 62.

In block S172, the CCD 3 captures a second image of the selected circle 62. It may be understood that, the second image of the selected circle 62 includes an image circle.

In block S173, the scaling computing module 113 determines boundary points of the image circle in the second image of the selected circle 62 according to gray values, and fits the boundary points to form a second fitting circle.

In block S174, the scaling computing module 113 determines the accurate scaling of the lens 4 by computing the ratio of a diameter of the second fitting circle and a diameter of the selected circle 62.

Figure 10:
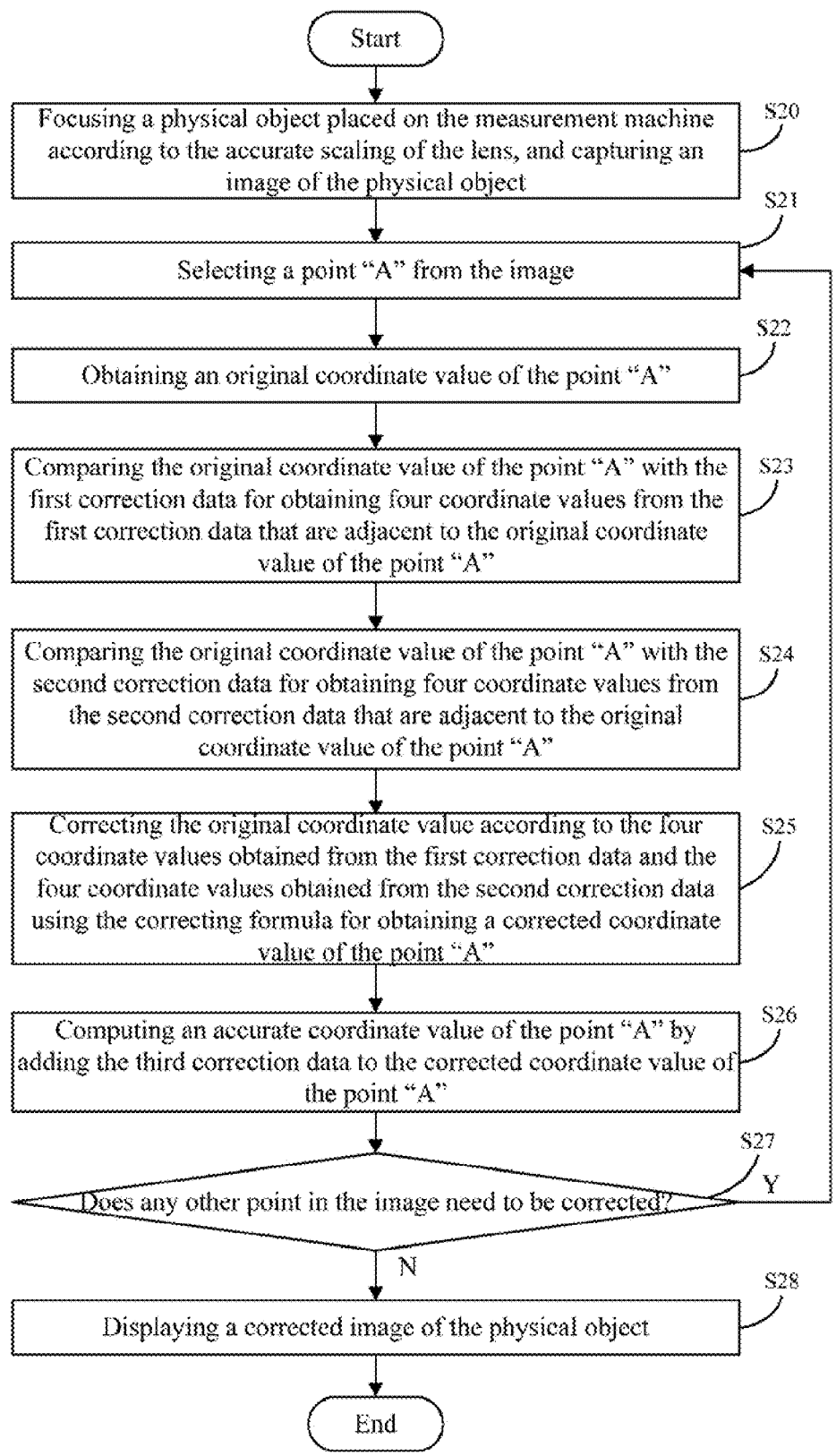
FIG. 10 is a flowchart illustrating one embodiment of a method for correcting an image using the correction data in FIG. 5.

FIG. 10 is a flowchart illustrating one embodiment of a method for correcting an image using the correction data computed in FIG. 5. Depending on the embodiment, additional blocks in the flow of FIG. 10 may be added, others removed, and the ordering of the blocks may be changed.

In block S20, the lens 4 focuses on the physical object 8 placed on the measurement machine 2 according to the accurate scaling, and the CCD 3 captures an image of the physical object 8.

In block S21, the image correcting module 116 selects a point "A" from the image of the physical object 8.

In block S22, the image correcting module 116 obtains an original coordinate value of the point "A."

In block S23, the image correcting module 116 compares the original coordinate value of the point "A" with the first correction data, so as to obtain four coordinate values from the first correction data that are adjacent to the original coordinate value of the point "A". For example, if the original coordinate value of the point "A" is (5,5), and the first correction data includes (4,4), (4,5), (4,6), (5,4), (5,6), (6,4), (6,5), and (6,6), the coordinate values that are adjacent to the original coordinate value (5,5) are (4,5), (5,4), (6,5), and (5,6).

In block S24, the image correcting module 116 compares the original coordinate value of the point "A" with the second correction data, so as to obtain four coordinate values from the second correction data that are adjacent to the original coordinate value of the point "A."

In block S25, the image correcting module 116 corrects the original coordinate value of the point "A" according to the original coordinate value, the four coordinate values obtained from the first correction data and the four coordinate values obtained from the second correction data using the bilinear transformation formula for obtaining a corrected coordinate value of the point "A."

In block S26, the image correcting module 116 computes an accurate coordinate value of the point "A" by adding the third correction data to the corrected coordinate value of the point "A."

In block S27, the image correcting module 116 judges if any other points to be corrected exists in the image of the physical object 8. If exist, the flow returns to block S21 described above. Otherwise, if none exists, the flow moves to block S28 described below.

In block S28, the displaying module 117 displays a corrected image of the physical object 8 through the monitor of the computer 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based method for correcting an image of a physical object, the method comprising:
   controlling movement of a charge coupled device (CCD) comprising a lens positioned on a Z-axis of a measurement machine to focus on a circle of a calibration plate of the measurement machine, and enable the CCD to capture a first image of the circle;
   determining an original scaling of the lens using the circle and the first image of the circle;
   controlling movement of the Z-axis of the measurement machine to enable the lens to focus on a rectangle set of the calibration plate, and enable the CCD to capture images of the rectangle set;
   determining correction data according to the original scaling of the lens using the images of the rectangle set, wherein the correction data comprises a first correction data, a second correction data, and a third correction data;
   controlling movement of the Z-axis of the measurement machine to enable the lens to focus on the circle of the calibration plate again, and enable the CCD to capture a second image of the circle;
   determining an accurate scaling of the lens according to the correction data using the circle and the second image of the circle;
   correcting the image of the physical object according to the correction data and the accurate scaling of the lens; and
   displaying a corrected image of the physical object on a monitor.

2. The method as described in claim 1, before the block of controlling movement of the CCD, further comprising:
   transforming a coordinate system of the measurement machine to a new coordinate system whose origin is the center of the circle of the calibration plate.

3. The method as described in claim 1, further comprising:
   storing the correction data and the accurate scaling of the lens into a storage device.

4. The method as described in claim 1, wherein determining the original scaling of the lens comprises:
   creating at least one straight line on the first image of the circle;
   comparing gray values of points of the straight line;
   selecting one or more points whose gray value is distinctly different from their adjacent point's gray value to determine boundary points of an image circle in the first image of the circle;
   fitting the boundary points to form a first fitting circle; and
   determining the original scaling of the lens by computing the ratio of a diameter of the first fitting circle and a diameter of the circle of the calibration plate.

5. The method as described in claim 1, wherein determining the first correction data comprises:
   focusing on the rectangle set by the lens, and capturing a first image of the rectangle set by the CCD, wherein the first image of the rectangle set comprises an image rectangle set, and the image rectangle set includes a plurality of image rectangles having a same size and a same horizontal space and vertical space;
   determining boundary points $Pn\_top$, $Pn\_bottom$, $Pn\_left$, and $Pn\_right$ of each image rectangle in the first image of the rectangle set;
   determining a center of each image rectangle according to the boundary points $Pn\_top$, $Pn\_bottom$, $Pn\_left$, and $Pn\_right$; and
   determining the first correction data by computing a coordinate value of the center of each image rectangle in the first image of the rectangle set according to the coordinate values of the boundary points $Pn\_top$, $Pn\_bottom$, $Pn\_left$, and $Pn\_right$.

6. The method as described in claim 5, wherein determining boundary points of each image rectangle comprises:
   obtaining a center "P" of the first image of the rectangle set, and obtaining an nearest image rectangle which is nearest to the point "P" in the first image of the rectangle set;
   determining a center of the nearest image rectangle by fitting a circle;
   creating orthogonal/perpendicular lines intersecting the center of the nearest image rectangle;
   determining boundary points in the lines according to gray values, the boundary points comprising $P1\_top$, $P2\_top$, $P1\_bottom$, $P2\_bottom$, $P1\_left$, $P2\_left$, $P1\_right$, and $P2\_right$;
   computing a length and a width of each image rectangle in the first image of the rectangle set according to the boundary points $P1\_top$, $P1\_bottom$, $P1\_left$, and $P1\_right$;
   computing a horizontal space and a vertical space between two adjacent image rectangles in the first image of the rectangle set according to the boundary points $P1\_top$, $P2\_top$, $P1\_left$, and $P2\_left$;
   determining a center of each image rectangle in the first image of the rectangle set according to the center of the nearest image rectangle, the length and the width of the nearest image rectangle, the horizontal space, and the vertical space;
   creating orthogonal/perpendicular lines intersecting the center of each image rectangle; and
   determining boundary points $Pn\_top$, $Pn\_bottom$, $Pn\_left$, and $Pn\_right$ of each image rectangle in the first image of the rectangle set.

7. The method as described in claim 5, wherein determining the second correction data comprises:
   determining a center of the image rectangle set according to the center of each image rectangle in the first image;
   focusing on the rectangle set again according to the center of the image rectangle set and the original scaling, and capturing a second image of the rectangle set, wherein the second image of the rectangle set includes an image rectangle set, and the image rectangle set comprises a plurality of image rectangles;
   determining boundary points of each image rectangle in the second image;
   determining a center of each image rectangle in the second image of the rectangle set according to the boundary points; and
   determining the second correction data by computing a coordinate value of the center of each image rectangle in the second image of the rectangle set according to the coordinate values of the boundary points.

8. The method as described in claim 7, wherein determining the third correction data comprises:
   obtaining a center of the second image of the rectangle set, and obtaining an original coordinate value of the center of the second image of the rectangle set;
   obtaining four image rectangles which are adjacent to the center of the second image of the rectangle set;
   taking coordinate values of the centers of the four image rectangles in the second image from the second correction data as a first data;
   taking coordinate values of the centers of corresponding four image rectangles in the first image from the first correction data as a second data;
   correcting the original coordinate value of the center of the second image of the rectangle set according to the first data, the second data, and a bilinear transformation formula, to obtain a corrected coordinate value of the center of the second image of the rectangle set; and
   determining the third correction data by computing a difference between the original coordinate value and the corrected coordinate value of the center of the second image of the rectangle set.

9. The method as described in claim 1, wherein determining the accurate scaling of the lens comprises:
   obtaining an original coordinate value of the center of the image circle in the first image of the circle;
   computing an corrected coordinate value of the center of the image circle in the first image of the circle according to the original coordinate value, the first correction data, and the second correction data, the third correction data;
   focusing on the circle again by the lens according to the original scaling and the corrected coordinate value of the center of the image circle in the first image of the circle;
   capturing a second image of the circle, wherein the second image of the circle comprises an image circle;
   determining boundary points of the image circle in the second image of the circle according to gray values of points in the second image of the circle;
   fitting the boundary points to form a second fitting circle; and
   determining the accurate scaling of the lens by computing the ratio of a diameter of the second fitting circle and a diameter of the circle.

10. The method as described in claim 1, wherein correcting the image of the physical object comprises:
    capturing the image of the physical object;
    selecting a point one by one from the image of the physical object;
    obtaining an original coordinate value of the point;
    comparing the original coordinate value of the point with the first correction data to obtain four coordinate values from the first correction data that are adjacent to the original coordinate value of the point;
    comparing the original coordinate value of the point with the second correction data to obtain four coordinate values from the second correction data that are adjacent to the original coordinate value of the point;
    correcting the original coordinate value of the point according to the four coordinate values obtained from the first correction data and the four coordinate values obtained from the second correction data to obtain a corrected coordinate value of the point; and
    computing an accurate coordinate value of the point by adding the third correction data to the corrected coordinate value of the point.

11. A non-transitory storage medium having stored thereon instructions that, when executed by a processor, causing the processor to perform a method for correcting an image of a physical object, the method comprising:
    controlling movement of a charge coupled device (CCD) comprising a lens positioned on a Z-axis of a measurement machine to focus on a circle of a calibration plate of the measurement machine, and enable the CCD to capture a first image of the circle;
    determining an original scaling of the lens using the circle and the first image of the circle;
    controlling the Z-axis of the measurement machine to move, so that the lens focuses on a rectangle set of the calibration plate, and the CCD captures images of the rectangle set;
    determining correction data according to the original scaling of the lens using the images of the rectangle set, wherein the correction data comprises a first correction data, a second correction data, and a third correction data;
    controlling the Z-axis of the measurement machine to move, so that the lens focuses on the circle of the calibration plate again, and the CCD captures a second image of the circle;
    determining an accurate scaling of the lens according to the correction data using the circle and the second image of the circle;
    correcting the image of the physical object according to the correction data and the accurate scaling of the lens; and
    displaying a corrected image of the physical object on a monitor.

12. The non-transitory storage medium as described in claim 11, before the block of controlling movement of the CCD, the method further comprises:
    transforming a coordinate system of the measurement machine to a new coordinate system whose origin is the center of the circle of the calibration plate.

13. The non-transitory storage medium as described in claim 11, wherein determining the original scaling of the lens comprises:
    creating at least one straight line on the first image of the circle;
    compares gray values of points of the straight line;
    selecting one or more points whose gray value is distinctly different from the adjacent point's gray value for determining boundary points of an image circle in the first image of the circle;

fitting the boundary points to form a first fitting circle; and
determining the original scaling of the lens by computing the ratio of a diameter of the first fitting circle and a diameter of the circle of the calibration plate.

14. The non-transitory storage medium as described in claim 11, wherein determining the first correction data and the second correction data comprises:
focusing on the rectangle set, and capturing a first image of the rectangle set, wherein the first image of the rectangle set comprises an image rectangle set, and the image rectangle set includes a plurality of image rectangles;
determining boundary points Pn_top, Pn_bottom, Pn_left, and Pn_right of each image rectangle in the first image of the rectangle set;
determining a center of each image rectangle according to the boundary points Pn_top, Pn_bottom, Pn_left, and Pn_right;
determining the first correction data by computing a coordinate value of the center of each image rectangle in the first image of the rectangle set according to the coordinate values of the boundary points Pn_top, Pn_bottom, Pn_left, and Pn_right;
determining a center of the image rectangle set according to the center of each image rectangle in the first image;
focusing on the rectangle set again according to the center of the image rectangle set and the original scaling, and capturing a second image of the rectangle set, wherein the second image of the rectangle set includes an image rectangle set, and the image rectangle set includes a plurality of image rectangles;
determining boundary points of each image rectangle in the second image;
determining a center of each image rectangle in the second image of the rectangle set according to the boundary points; and
determining the second correction data by computing a coordinate value of the center of each image rectangle in the second image of the rectangle set according to the coordinate values of the boundary points.

15. The non-transitory storage medium as described in claim 14, wherein determining boundary points of each image rectangle comprises:
obtaining a center "P" of the first image or the second image of the rectangle set, and obtaining an nearest image rectangle which is nearest to the point "P" from the first image or the second image of the rectangle set;
determining a center of the nearest image rectangle by fitting a circle;
creating orthogonal/perpendicular lines intersecting the center of the nearest image rectangle;
determining boundary points in lines according to gray values, the boundary points include P1_top, P2_top, P1_bottom, P2_bottom, P1_left, P2_left, P1_right, and P2_right;
computing a length and a width of the image rectangle according to the boundary points P1_top, P1_bottom, P1_left, and P1_right;
computing a horizontal space and a vertical space between two adjacent image rectangles in the first image or the second image of the rectangle set according to P1_top, P2_top, P1_left, and P2_left;
determining a center of each image rectangle in the first image or the second image of the rectangle set according to the center of the nearest image rectangle, the length and the width of the image rectangle, the horizontal space, and the vertical space;
creating orthogonal/perpendicular lines intersecting the center of each image rectangle; and
determining boundary points Pn_top, Pn_bottom, Pn_left, and Pn_right of each image rectangle in the first image or the second image of the rectangle set.

16. The non-transitory storage medium as described in claim 14, wherein determining the third correction data comprises:
obtaining a center of the second image of the rectangle set, and obtaining an original coordinate value of the center of the second image of the rectangle set;
obtaining four image rectangles which are adjacent to the center of the second image of the rectangle set;
obtaining coordinate values of the centers of the four image rectangles in the second image from the second correction data as a first data;
obtaining coordinate values of the centers of corresponding four image rectangles in the first image from the first correction data as a second data
correcting the original coordinate value of the center of the second image of the rectangle set according to the first data, the second data, and a bilinear transformation formula to obtain a corrected coordinate value of the center of the second image of the rectangle set; and
determining the third correction data by computing a difference between the original coordinate value and the corrected coordinate value of the center of the second image of the rectangle set.

17. The non-transitory storage medium as described in claim 11, wherein correcting the image of the physical object comprises:
capturing the image of the physical object;
selecting a point one by one from the image of the physical object;
obtaining an original coordinate value of the point;
comparing the original coordinate value of the point with the first correction data to obtain four coordinate values from the first correction data that are adjacent to the original coordinate value of the point;
comparing the original coordinate value of the point with the second correction data to obtain four coordinate values from the second correction data that are adjacent to the original coordinate value of the point;
correcting the original coordinate value of the point according to the four coordinate values obtained from the first correction data and the four coordinate values obtained from the second correction data using a bilinear transformation formula to obtain a corrected coordinate value of the point; and
computing an accurate coordinate value of the point by adding the third correction data to the corrected coordinate value of the point.

18. A computing system for correcting an image of a physical object, comprising:
a controlling module operable to control movement of a charge coupled device (CCD) comprising a lens positioned on a Z-axis of a measurement machine to focus on a circle of a calibration plate of the measurement machine, and enable the CCD to capture a first image of the circle;
a scaling computing module operable to determine an original scaling of the lens using the circle and the first image of the circle;
the controlling module further operable to control the Z-axis of the measurement machine to move, so that the lens focuses on a rectangle set of the calibration plate, and the CCD captures images of the rectangle set;

a correction data computing module operable to determine correction data according to the original scaling of the lens using the images of the rectangle set, wherein the correction data comprises a first correction data, a second correction data, and a third correction data;

the controlling module further operable to control the Z-axis of the measurement machine to move, so that the lens focuses on the circle of the calibration plate again, and the CCD captures a second image of the circle;

the scaling computing module further operable to determine an accurate scaling of the lens according to the correction data using the circle and the second image of the circle;

an image correcting module operable to correct the image of the physical object according to the correction data and the accurate scaling of the lens;

a displaying module operable to display a corrected image of the physical object; and a processor that executes the controlling module, the scaling computing module, the correction data computing module, the image correcting module, and the displaying module.

19. The computing system as described in claim 18, further comprising:

a coordinate system transforming module operable to transform a coordinate system of the measurement machine to a new coordinate system whose origin is the center of the circle.

20. The system as described in claim 18, further comprising:

a storing module operable to store the scaling of the lens and the correction data into a storage device.

* * * * *